United States Patent [19]
Kunz et al.

[11] Patent Number: 5,213,912
[45] Date of Patent: May 25, 1993

[54] MOLTEN CARBONATE FUEL CELL SULFUR SCRUBBER

[75] Inventors: Harold R. Kunz, Vernon; Richard A. Sederquist, Newington; Ole L. Olesen, South Windsor, all of Conn.

[73] Assignee: International Fuel Cells Corporation, South Windsor, Conn.

[21] Appl. No.: 814,520

[22] Filed: Dec. 30, 1991

[51] Int. Cl.⁵ .................................................. H01M 8/04
[52] U.S. Cl. .................................... 429/34; 429/16; 429/17; 429/19
[58] Field of Search ............... 429/16, 17, 19, 34, 429/39

[56] References Cited

U.S. PATENT DOCUMENTS

| | | | |
|---|---|---|---|
| 4,120,668 | 10/1978 | Fraley | 55/72 |
| 4,704,340 | 11/1987 | Kunz | 429/16 X |
| 4,921,765 | 5/1990 | Gmeindl et al. | 429/16 |
| 4,925,745 | 5/1990 | Remick et al. | 429/40 |
| 4,994,331 | 2/1991 | Cohen | 429/17 |
| 5,079,103 | 1/1992 | Schramm | 429/17 |

OTHER PUBLICATIONS

"Effects of Sulfur on Molten Carbonate Fuel Cells", Proceedings of the Symposium on Molten Carbonate Fuel Cells, The Electrochemical Society, Montreal, Canada, May, 1982, Proc. vol. 84-13, pp. 246-270.

Primary Examiner—John S. Maples
Attorney, Agent, or Firm—Pamela J. Curbelo

[57] ABSTRACT

Sulfur compounds poison catalysts, such as the anode catalysts and reformer catalysts within molten carbonate fuel cell systems. This poisoning is eliminated using a sulfur scrubber 29 located prior to the inlet of the cathode chamber 13. Anode exhaust 19 which contains water, carbon dioxide and possibly sulfur impurities, is combined with a cathode exhaust recycle stream 22 and an oxidant stream 25 and burned in a burner 33 to produce water, carbon dioxide. If sulfur compounds are present in either the anode exhaust, cathode exhaust stream, or oxidant stream, sulfur trioxide and sulfur dioxide are produced. The combined oxidant-combustion stream 27 from the burner 33 is then directed through a sulfur scrubber 29 prior to entering the cathode chamber 13. The sulfur scrubber 29 absorbs sulfur compounds from the combined oxidant-combustion stream 27. Removal of the sulfur compounds at this point prevents concentration of the sulfur in the molten carbonate fuel cell system. Therefore, neither the reformer catalyst nor the anode 17 experience sulfur poisoning.

10 Claims, 1 Drawing Sheet

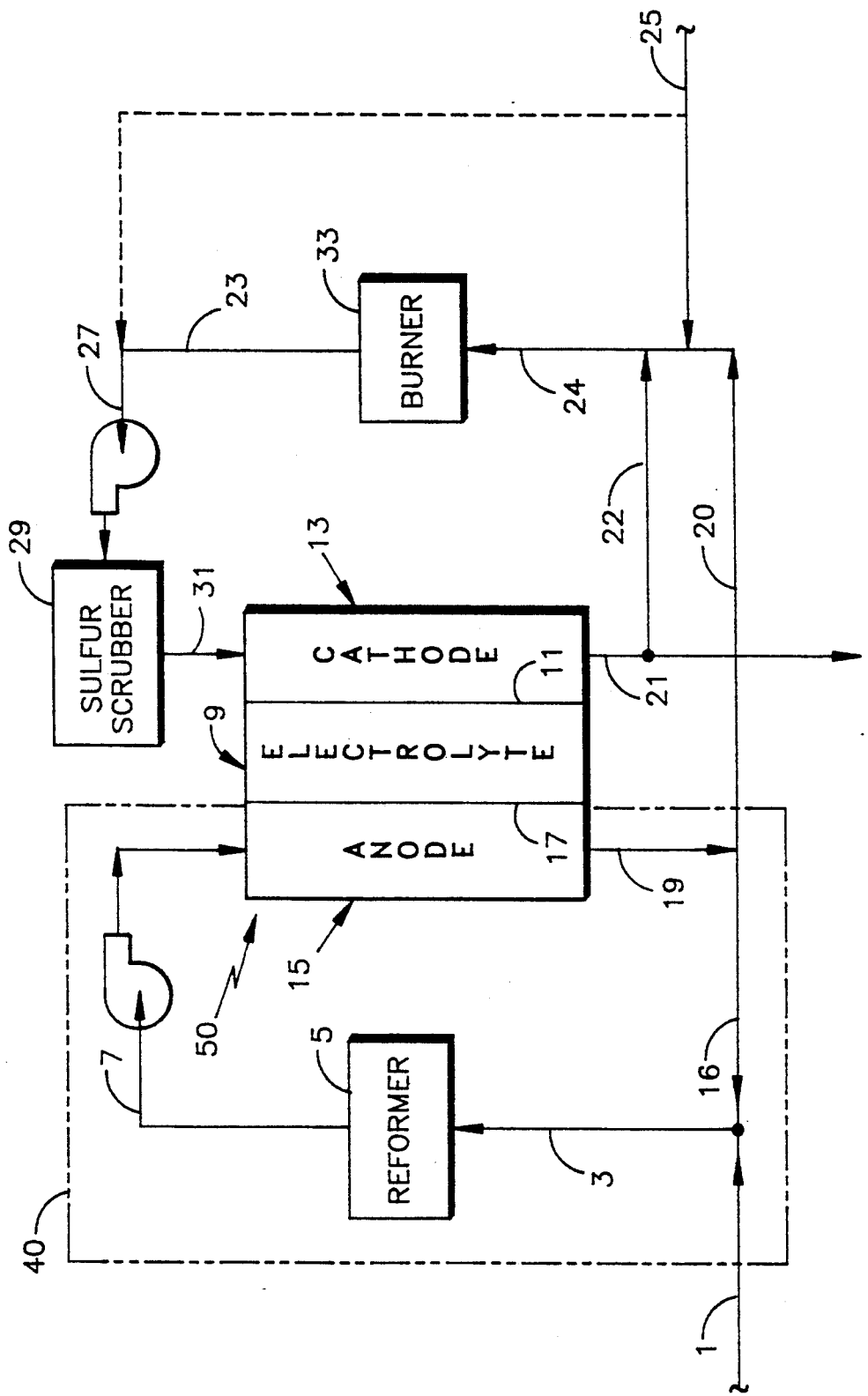

1

MOLTEN CARBONATE FUEL CELL SULFUR SCRUBBER

DESCRIPTION

Technical Field

The present invention relates to the removal of sulfur compounds from a molten carbonate fuel cell system, and especially to the removal of sulfur compounds in the oxidant stream of a molten carbonate fuel cell system.

Background of the Invention

Molten carbonate fuel cell systems can be used in the production of electricity. These systems typically comprise a reformer for converting hydrocarbon fuels to hydrogen and byproducts, a burner, and a plurality of molten carbonate fuel cells. The fuel cells operate such that oxygen contained in an oxidant stream reacts with carbon dioxide and free electrons at a cathode to produce carbonate ions. These carbonate ions migrate across a molten carbonate electrolyte to an anode where they react with hydrogen contained in a fuel stream to produce water, carbon dioxide, and free electrons. The free electrons pass through an external load back to the cathode, thereby producing electricity, while the carbon dioxide, water, and any remaining hydrogen exit the anode in the fuel stream.

In molten carbonate fuel cell systems, the fuel and oxidant streams are often contaminated or can become contaminated with sulfur compounds such as sulfur dioxide, sulfur trioxide, and hydrogen sulfide. These sulfur compounds can poison various components of the fuel cell system including the anode and the catalyst used in the reformer. The anode is readily poisoned by contact with sulfur compounds in amounts exceeding about 1 to 2 parts per million (ppm) by volume while the reformer catalyst is poisoned at very low sulfur concentrations, even below about 0.1 ppm by volume. Poisoning the anode reduces its activity and therefore its ability to convert hydrogen and carbonate ions to water, carbon dioxide, and free electrons while poisoning the reformer catalyst reduces its activity and therefore its ability to convert hydrocarbon fuels to hydrogen. As a result of this poisoning, the activity of the anode and the reformer catalyst, and the life of the molten carbonate fuel cell system are all reduced.

Reformer catalyst poisoning has conventionally been eliminated by purifying the fuel stream prior to its introduction to the reformer. However, the fuel stream is not the only source of sulfur. In a molten carbonate fuel cell sulfur is also introduced by the oxidant stream. This sulfur can concentrate within the molten carbonate fuel cell and poison the anode or reformer catalyst within the molten carbonate fuel cell system. In the molten carbonate fuel cell system, the oxidizing conditions at the cathode cause the molten carbonate electrolyte to have a high affinity for sulfur compounds. As a result, the amount of sulfur trapped within the molten carbonate fuel cell system increases with time.

Sulfur is typically introduced to the molten carbonate fuel cell system in the oxidant stream which is directed to the cathode where it is converted to sulfate ions. The sulfate ions migrate across the molten carbonate electrolyte to the anode where they are converted with hydrogen to hydrogen sulfide and released into the fuel stream. The fuel stream then exits the anode and is directed to a burner where it is burned. Within the burner, the hydrogen sulfide is converted to sulfur dioxide and sulfur trioxide. The burned stream is then directed along with the oxidant stream back to the cathode. Although a portion of the stream exiting the cathode is generally vented, the high affinity and capture of sulfur at the cathode results in an essentially sulfur-free cathode exhaust stream. Therefore, none of the sulfur is vented. The sulfur concentration simply continues to build up within the molten carbonate fuel cell system, thereby compounding the sulfur poisoning problem.

What is needed in the art is a means for removing sulfur compounds from a molten carbonate fuel cell system to prevent contamination of the reformer catalyst and the anode.

DISCLOSURE OF THE INVENTION

The present invention relates to an improved molten carbonate fuel cell system. This system includes a fuel stream inlet, an oxidant stream inlet, and a molten carbonate fuel cell having an anode chamber, a cathode chamber, an anode, a cathode and an electrolyte disposed therebetween and in intimate contact with said anode and cathode. The improvement comprises a sulfur scrubber in flow communication with oxidant stream inlet and said cathode chamber.

The present invention further relates to the removal of sulfur from a molten carbonate fuel cell system. This removal method includes introducing a fuel stream containing hydrogen to the anode where the hydrogen reacts with carbonate ions to form carbon dioxide, water, and free electrons, and also reacts with sulfate ions to form hydrogen sulfide. The reformed fuel stream is then removed from the anode as anode exhaust. An oxidant stream is introduced to a sulfur scrubber which absorbs any sulfur compounds. The scrubbed stream is then introduced to the cathode where the oxygen, carbon dioxide, and free electrons react to form carbonate ions which migrate across the electrolyte to react with the hydrogen. The scrubbed stream then exits the cathode as a cathode exhaust stream.

The foregoing and other features and advantages of the present invention will become more apparent from the following description and accompanying drawing.

BRIEF DESCRIPTION OF THE DRAWING

The figure is one embodiment of the molten carbonate fuel cell system of the present invention.

BEST MODE FOR CARRYING OUT THE INVENTION

Referring to the Figure, which is meant to be exemplary not limiting, the molten carbonate fuel cell system of the present invention includes a reformer 5 having a reformer catalyst, a molten carbonate fuel cell 50, a burner 33, and a sulfur scrubber 29. The molten carbonate fuel cell 50 can either be a single molten carbonate fuel cell or a plurality of molten carbonate fuel cells which are typically electrically connected in series. Each fuel cell has an anode chamber 15, a cathode chamber 13, an anode 17, a cathode 11, and a molten carbonate electrolyte 9 disposed therebetween and in intimate contact with the anode 17 and cathode 11.

Operation of this molten carbonate fuel cell system comprises introducing a fuel stream 1 and water vapor to the reformer 5. The fuel stream 1 is generally a hydrogen stream or a conventional hydrocarbon fuel such as naphtha, natural gas, propane, coal gas, and others.

Since this fuel typically contains sulfur impurities, it is preferred to pretreat the fuel prior to introducing it to the molten carbonate fuel cell system, thereby reducing poisoning of the reformer catalyst. It should be noted that even the pretreated fuel stream typically contains some sulfur impurities. However, this source of sulfur should be minimal and less than about 5% of the total sulfur introduced to the system, typically equal to or less than about 0.01 ppm.

The water vapor entering the reformer 5 is generally provided by recycling a large portion of the anode exhaust 19 to the reformer 5 via anode exhaust recycle stream 16. Additional water vapor can be introduced with the fuel stream if desired.

Within the reformer 5, the combined fuel and anode exhaust recycle stream 3 intimately contacts the reformer catalyst and reacts in an endothermic reaction to form hydrogen, carbon dioxide and carbon monoxide. Heat for this endothermic reaction is preferably provided by the waste heat in the anode exhaust recycle stream 16 which is at elevated temperatures, typically between about 1100° F. (593° C.) and about 1300° F. (705° C.). The reformer catalyst is a conventional steam reformer catalyst such as nickel based catalysts, and noble metal based catalysts such as platinum, ruthenium, palladium, rhodium, among others, while the reformer 5 is an adiabatic reformer which uses sensible heat in the stream entering the reformer to provide the endothermic heat required for the reforming the hydrocarbon fuel to hydrogen, carbon dioxide, and carbon monoxide.

The reformer 5 is typically located in an anode gas recycle loop 40 prior to the molten carbonate fuel cell 50 such that the fuel is converted to hydrogen prior to entering the fuel cell. It is preferred to locate the reformer 5 external to the molten carbonate fuel cell 50, thereby isolating the reformer catalyst from the molten carbonate electrolyte which can poison it. Additionally, such a location allows the use of larger volumes of catalyst than can conveniently fit within the anode cavity, thereby reducing the frequency in which this catalyst must be replaced. Finally, locating the reformer 5 external to the molten carbonate fuel cell allows easier replacement of the reformer catalyst. However, the spirit and scope of the present invention are not affected by the placement of the reformer.

From the reformer 5, the reformed fuel stream 7 is directed to the anode chamber 15 where it contacts the anode 17 which is a conventional catalyst for use within a molten carbonate fuel cell. At the anode 17, the hydrogen reacts with carbonate ions to form carbon dioxide, water, and free electrons, and, if sulfate ions are present, the hydrogen reacts with these sulfate ions to form hydrogen sulfide. The hydrogen sulfide, water, carbon dioxide, hydrogen, and byproducts then exit the anode chamber 15 as anode exhaust 19. A large portion of this anode exhaust 19 may be recycled to the reformer 5 while the remainder anode exhaust stream 20 can be directed to the burner 33.

The remainder anode exhaust stream 20 may be combined with a cathode exhaust recycle stream 22. This cathode exhaust recycle stream 22 supplies oxygen necessary for operation of the burner 33. This combined stream 24 is then directed to the burner 33 where it is burned to form water, carbon dioxide, sulfur trioxide, sulfur dioxide and other byproducts. The burner 33 is typically a catalytic burner containing a combustion catalyst in the form of pellets or honeycomb monolith. This burner is typically operated at temperatures between about 1100° F. (593° C.) and about 1600° F. (870° C.).

An oxidant stream 25, which is any oxygen containing stream, can either be combined with the remainder anode exhaust stream 20 and the cathode exhaust recycle stream 22 prior to the burner or it can be introduced to the combustion stream 23 exiting the burner 33. Generally, the oxidant stream 25 is an air stream which may also contain sulfur impurities, typically in the form of sulfur dioxide in concentrations between about 10 to about 50 parts per billion (ppb) by volume. Although this sulfur dioxide concentration is small, the total amount of sulfur introduced into the molten carbonate fuel cell system in the air is often a significant amount since a large volumetric flow of air is used as both oxidant and for cooling the fuel cell. Sulfur introduced in the air can represent greater than about 95% of the potential sulfur introduced into the system by both the fuel and oxidant streams. Therefore, scrubbing the oxidant stream prior to introducing it to the cathode chamber 13 is extremely important in diminishing poisoning problems in the molten carbonate fuel cell system.

In order to remove the sulfur from the oxidant stream 25, it is directed to the sulfur scrubber 29 where it contacts a sorbent material capable of absorbing sulfur compounds. Since the combustion stream 23 may also contain some sulfur impurities which entered the molten carbonate fuel cell system in the fuel stream 1 or which were not removed in the scrubber and passed to the fuel stream through the molten carbonate electrolyte, it is preferred to pass the combined oxidant-combustion stream 27 through the sulfur scrubber 29. By introducing a combined oxidant-combustion stream 27 to the sulfur scrubber 29, the sulfur scrubber 29 is able to scrub all sources of sulfur within or entering the molten carbonate fuel cell system, thereby minimizing and limiting the accumulation of sulfur in the molten carbonate fuel cell system. Essentially all of the sulfur entering the molten carbonate fuel cell system is removed in the sulfur scrubber 29.

Sorbent materials used in the sulfur scrubber 25 which are particularly useful with the present invention include alkaline carbonates such as carbonates of lithium, potassium, sodium, and others which form sulfates. These carbonates are typically in the form of molten carbonates which would be supported on a ceramic material such as lithium aluminate. Generally, this support is in the form of pellets or monolithic honeycomb.

The sorbent material absorbs sulfur compounds, particularly sulfur oxides. These sulfur oxides are eventually absorbed as alkaline sulfates. Since sulfur trioxide readily reacts with the sorbent material to form sulfates, conversion of the sulfur compounds, especially sulfur dioxide, to sulfur trioxide will improve the efficiency of the sulfur scrubber 29. Therefore, the use of the sorbent material in combination with a catalyst capable of converting sulfur dioxide to sulfur trioxide is preferred. This catalyst is typically interspersed with the sorbent material and serves to enhance and complete the reaction of sulfur dioxide with oxygen to sulfur trioxide. The sulfur trioxide then reacts with the sorbent material to form a sulfate which is the most stable form of the absorbed sulfur, and therefore the most desirable form.

This scrubber catalyst can be any conventional catalyst capable of converting sulfur dioxide to sulfur trioxide. Some possible catalysts include: nickel based catalysts such as nickel oxide, noble metal based catalysts such as platinum, and other metallic catalysts such as copper based catalysts, silver based catalysts, vanadium based catalysts, mixtures thereof, and others. Vanadium pentoxide is used industrially for the oxidation of sulfur dioxide to sulfur trioxide.

The sulfur scrubber 29 is preferably operated at temperatures ranging from about 1000° F. (538° C.) to about 1300° F. (705° C.), with a temperature between about 1100° F. (593° C.) and about 1200° F. (649° C.) especially preferred. If the sorbent material is molten carbonate, temperatures below about 1000° F. (538° C.) will cause the molten carbonate to solidify thereby reducing the sulfur scrubber 29 effectiveness while temperatures above about 1300° F. (705° C.) exceed the temperature limit of the molten carbonate fuel cell 50.

Eventually, the sorbent material within the sulfur scrubber 29 becomes saturated with sulfur compounds. For example, essentially all of the molten carbonate reacts with sulfur trioxide, thereby converting all of the molten carbonate to sulfates. As a result, the sorbent material is replaced. It is foreseen that the sulfur material within the sulfur scrubber 29 could be regenerated and that a plurality of sulfur scrubbers could be employed with the present invention. If a plurality of sulfur scrubbers are utilized, a portion of these scrubbers will absorb sulfur compounds while the remainder of these scrubbers will be regenerated. Although such a system is possible, it is not presently considered cost effective since the cost of sorbent materials is relatively low while the cost of a system for regenerating the sorbent material is comparatively high. Such a system may, however, be useful where cost is a secondary issue and volume and/or weight considerations are paramount.

Once the sulfur compounds have been removed from the combined oxidant-combustion stream 27 in the sulfur scrubber 29, the scrubbed stream 31 is introduced to the cathode chamber 13 of the molten carbonate fuel cell 50. At the cathode 11, in the cathode chamber 13, the scrubbed stream 31 intimately contacts a conventional catalyst where oxygen and carbon dioxide in the scrubbed stream 31 react with free electrons which have passed from the anode 17 to the cathode 11 through an external load, to produce carbonate ions. These carbonate ions migrate across the molten carbonate electrolyte 9 to the anode 17 where they react with hydrogen in the formation of water, carbon dioxide, and free electrons. Meanwhile, the scrubbed stream 31 exits the cathode chamber 13 as cathode exhaust stream 21 some of which is vented and the remainder is recycled and combined with the anode exhaust 20.

Advantages of the present invention are readily apparent. The present invention is an efficient effective method of removing sulfur from a molten carbonate fuel cell system and therefore results in an effective molten carbonate fuel cell system. Unlike the prior art, sulfur compounds are not concentrated within the molten carbonate fuel cell system. As a result, sulfur poisoning of the anode is essentially eliminated, sulfur poisoning of the reformer catalyst is significantly reduced if not eliminated, and the life of the overall molten carbonate fuel cell system is increased.

The present system further reduces maintenance requirements. Since the life of the reformer catalyst and anode is increased, the period between installation and replacement is similarly increased. The present invention significantly improves and simplifies the molten carbonate fuel cell system of the prior art.

Although this invention has been shown and described with respect to detailed embodiments thereof, it will be understood by those skilled in the art that various changes in form and detail thereof may be made without departing from the spirit and scope of the invention.

We claim:

1. An improved molten carbonate fuel cell system, said system having a molten carbonate fuel cell formed by an anode, a cathode, and a molten carbonate electrolyte disposed therebetween, an anode chamber, and a cathode chamber, said system further having a fuel stream in flow communication with said anode chamber, and an oxidant stream in flow communication with said cathode chamber, wherein said improvement comprises: a sulfur scrubber which removes sulfur compounds from said oxidant stream, said sulfur scrubber in flow communication with said cathode chamber.

2. An improved molten carbonate fuel cell system as in claim 1 wherein said sulfur scrubber contains a sorbent material capable of absorbing sulfur compounds.

3. An improved molten carbonate fuel cell system as in claim 2 wherein said sorbent material is selected from the group consisting of alkaline metal carbonates.

4. An improved molten carbonate fuel cell system as in claim 2 wherein said sulfur scrubber further contains a catalyst capable of converting sulfur compounds to sulfur trioxide.

5. An improved molten carbonate fuel cell system as in claim 4 wherein said catalyst is selected from the group consisting of nickel based catalysts, noble metal based catalysts, silver based catalysts, copper based catalysts, vanadium based catalysts, and mixtures thereof.

6. An improved molten carbonate fuel cell system, said system having a molten carbonate fuel cell formed by an anode, a cathode, and a molten carbonate electrolyte disposed therebetween, an anode chamber, and a cathode chamber, said system further having a burner for burning anode exhaust, said burner in flow communication with said anode chamber, wherein said improvement comprises: a sulfur scrubber which removes sulfur compounds from a combined oxidant-combustion stream, said sulfur scrubber in flow communication with said burner, and said cathode chamber.

7. An improved molten carbonate fuel cell system as in claim 6 wherein said sulfur scrubber contains a sorbent material capable of absorbing sulfur compounds.

8. An improved molten carbonate fuel cell system as in claim 7 wherein said sorbent material is selected from the group consisting of alkaline metal carbonates.

9. An improved molten carbonate fuel cell system as in claim 7 wherein said sulfur scrubber further contains a catalyst capable of converting sulfur compounds to sulfur trioxide.

10. An improved molten carbonate fuel cell system as in claim 9 wherein said catalyst is selected from the group consisting of nickel based catalysts, noble metal based catalysts, silver based catalysts, copper based catalysts, vanadium based catalysts, and mixtures thereof.

* * * * *